UNITED STATES PATENT OFFICE.

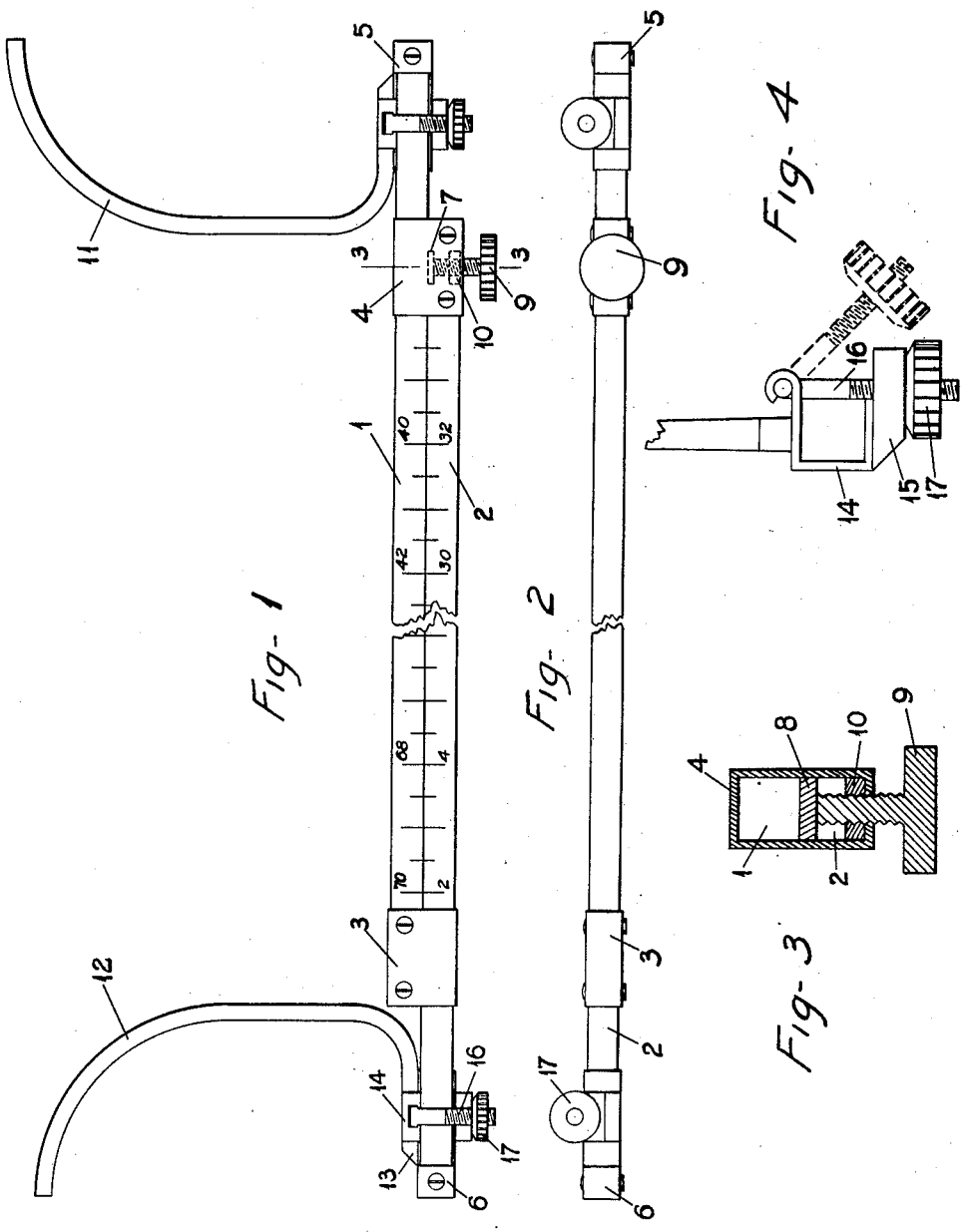

EARL LEWIS PATTERSON, OF COALINGA, CALIFORNIA.

COMBINED SLIDABLE GAUGE AND ALIGNING DEVICE.

1,407,803.  Specification of Letters Patent.  Patented Feb. 28, 1922.

Application filed August 24, 1921. Serial No. 495,025.

*To all whom it may concern:*

Be it known that I, EARL LEWIS PATTERSON, a citizen of the United States of America, and a resident of Coalinga, in the county of Fresno and State of California, have invented certain new and useful Improvements in Combined Slidable Gauge and Aligning Devices, of which the following is a specification, reference being had to the accompanying drawing, forming part thereof.

My invention relates to a combined adjustable gauge and aligning device which may be used as a general gauge or measuring instrument for any purpose or for the purpose of aligning wheels of automobiles and other vehicles.

An object of the invention is the provision of a pair of slidable companion members having graduations on the faces so arranged as to give the correct reading on one of the faces directly.

Another object of my invention is the provision of a caliper appliance which may be detachably connected to the slidable gauge when inside measurements are desired or when the device is used for aligning wheels.

A further object is the provision of a guard plate to prevent scarring of the slidable member by the clamping screw.

A still further object of this invention is the provision of a wear nut to prevent the clamping screw from becoming loose and rendering the device inaccurate.

To understand my invention fully, reference is to be had to the following description and the accompanying drawing in which:

Fig. 1 is a plan view of the gauge with the caliper appliance attached.

Fig. 2 is a side view of the gauge.

Fig. 3 is a section on line 3—3 of Fig. 1.

Fig. 4 is a detail view of the clamp for securing the caliper appliance, the dotted lines showing the screw disengaged and the bolt swung out to permit the ready removal of the clamp.

The slidable gauge comprises the rear body 1 and the front body 2, which are preferably made of wood and of any desired dimensions, and these bodies 1 and 2 slidably engage each other and are held in sliding contact with each other by means of guide members 3 and 4 secured, preferably by screws, to the bodies 1 and 2, respectively, but permitting the companion bodies 2 and 1, respectively, to slide therethrough, as is readily apparent.

At one end of the body 2, there is a countersink 7 in which is tightly fitted a guard plate 8 against which bears the clamping screw 9 suitably threaded as shown. This guard plate prevents the end of the screw 9 from scarring the companion body 1 as the two bodies are slid to obtain the desired measurement or alignment.

The screw 9 passes through a wear nut 10 instead of passing through the wooden sliding member thus preventing the screw from becoming loose and rendering the gauge inaccurate. The use of the wear nut is of great importance as the accuracy of the gauge is dependent on a proper relation of the companion members 1 and 2. However, this wear nut may be omitted if the gauge is used for rough work.

At the end of each member 1 and 2 are stops 5 and 6 to prevent entire disengagement of the sliding bodies from each other.

The stop members, clamp members and guard plate are made of brass or other suitable material having the required properties and the thumb screw and wear nut are made of case hardened steel.

Thus far, only the slidable gauge has been described and this gauge may be used for any purpose desired, especially for aligning the wheels of vehicles. I will now describe my caliper appliance which may be fixedly secured or detachably connected to my slidable gauge when desired at any time and for any purpose, as when inside measurements are required or when the gauge is employed as an aligning instrument to render the aligning of wheels more easy and accurate.

The caliper appliance has two fingers 11 and 12, curved as shown, attached adjacent to the stop members 5 and 6 of the companion bodies 1 and 2. As the manner of attaching each of the fingers to the respective body is the same, only one attaching member will be described.

The finger 12 is welded or riveted to the strip 13 fitting the body 2 and firmly held thereto by the clamp 14 shown in detail by Fig. 4. To the bottom of the clamp is welded or riveted or otherwise secured the member 15 to furnish a firm hold for the clamp bolt 16. The clamp bolt 16 is T-shaped to permit ready removal of the clamp as will be readily understood from an inspection of Fig. 4, the dotted lines showing the knurled thumb nut 17 loosened from the member 15 and the bolt swung out to permit removal of the clamp.

To obtain the desired measure, it is only necessary to extened the sliding members until the stops 5 and 6 of the bodies 1 and 2 or the ends of the fingers 11 and 12 contact with the object of measurement and then to clamp the guard plate against the body 1 by means of the clamping thumb screw 9. The gauge is then removed from the object of measurement and the undisturbed correct reading is obtained. The face of the rear body is graduated reversely to that of the front body so that a direct reading is had on the rear body as is apparent from an inspection of Fig. 1. The body 2 is graduated from left to right, say from one inch to thirty-six inches, while the body 1 is graduated from right to left, say from thirty-seven to seventy-two inches and the reading is taken on the rear body 1 at the right edge of the member 2, thereby making it unnecessary to add the reading of the rear member to the reading of the front member.

To properly align the wheels of vehicles, the members 1 and 2 are moved until the desired distance is read on the rear body 1. The members are then clamped in place and the gauge is placed between the wheels which are then adjusted until they engage the stops or the fingers of the caliper appliance.

While I have shown and described the preferred embodiment of my invention and explained several uses therefor, it will be understood that minor changes in construction and arrangement of parts may be made and other uses for the device will readily suggest themselves to one skilled in the art without departing from the scope of my invention as defined by the appended claims.

Having described my invention, what I claim and desire to secure by Letters Patent is:

1. In combination, a slidable gauge and aligning device, caliper fingers for said gauge and clamps on said fingers for connecting them to said gauge, said clamps comprising a U-shaped member slidably fitting the said gauge and having a T bolt rotatably mounted therein and a thumb nut for tightening the said bolt in place.

2. In combination, a slidable gauge comprising two members in sliding contact with each other, means for holding said members in said sliding contact, caliper fingers, means for attaching said caliper fingers to said members, said means comprising a U-shaped member attached to the caliper fingers and slidably fitting the gauge members and a T bolt rotatably mounted in said U-shaped member and adapted to hold said U-shaped member in place on the gauge member.

In witness whereof, I hereunto affix my signature this 18th day of August, A. D. 1921.

EARL LEWIS PATTERSON